United States Patent
Miura et al.

(10) Patent No.: US 12,012,255 B2
(45) Date of Patent: Jun. 18, 2024

(54) POUCH AND LIQUID CONTENT-CONTAINING POUCH

(71) Applicant: Toyo Seikan Co., Ltd., Tokyo (JP)

(72) Inventors: Takashi Miura, Yokohama (JP); Reina Atsumi, Yokohama (JP)

(73) Assignee: TOYO SEIKAN CO., LTD., Tokyo (JP)

(*) Notice: Subject to any disclaimer, the term of this patent is extended or adjusted under 35 U.S.C. 154(b) by 497 days.

(21) Appl. No.: 16/907,875

(22) Filed: Jun. 22, 2020

(65) Prior Publication Data

US 2020/0317404 A1 Oct. 8, 2020

Related U.S. Application Data

(63) Continuation of application No. PCT/JP2018/047178, filed on Dec. 21, 2018.

(30) Foreign Application Priority Data

Dec. 25, 2017 (JP) .............................. JP2017-247144

(51) Int. Cl.
*B65D 33/01* (2006.01)
*B32B 3/30* (2006.01)
(Continued)

(52) U.S. Cl.
CPC ............... *B65D 33/01* (2013.01); *B32B 3/30* (2013.01); *B32B 27/08* (2013.01); *B65D 65/40* (2013.01);
(Continued)

(58) Field of Classification Search
CPC .. B32B 1/02; B32B 3/266; B32B 3/30; B32B 7/027; B32B 15/085; B32B 15/088;
(Continued)

(56) References Cited

U.S. PATENT DOCUMENTS

| | | | |
|---|---|---|---|
| 6,638,588 B1 | 10/2003 | Bowen et al. | |
| 2005/0109796 A1* | 5/2005 | Bourque | B65D 75/008 222/129 |
| 2022/0089348 A1* | 3/2022 | Miura | B32B 27/32 |

FOREIGN PATENT DOCUMENTS

| | | |
|---|---|---|
| JP | 10-167335 A | 6/1998 |
| JP | 2001-231846 A | 8/2001 |

(Continued)

OTHER PUBLICATIONS

English Machine translation of the description of KR-20100058391-A, obtained from Espacenet (Year: 2010).*

(Continued)

*Primary Examiner* — Eli D. Strah
*Assistant Examiner* — Thomas J Kessler
(74) *Attorney, Agent, or Firm* — WHDA, LLP

(57) ABSTRACT

It is an object of the present invention to provide a pouch capable of releasing the fragrance component contained in the content to the outside without opening the pouch while avoiding leakage to the outside and deterioration in quality of the content with a simple configuration, and a liquid content-containing pouch. The pouch of the present invention is a pouch that is formed in a bag shape by forming an outer peripheral sealing part by thermally bonding a film, and accommodates a content in an accommodating part inward from the outer peripheral sealing part, wherein a fragrance component releasing part is formed at a position corresponding to the accommodating part on at least one side of the film, and the fragrance component releasing part is configured of at least one of a material-removed part and a notched score formed in a partial range in a thickness direction of the film.

12 Claims, 4 Drawing Sheets

(51) Int. Cl.
*B32B 27/08* (2006.01)
*B65D 65/40* (2006.01)
*B65D 65/42* (2006.01)
*B65D 75/00* (2006.01)
*B65D 75/58* (2006.01)

(52) U.S. Cl.
CPC .......... *B65D 65/42* (2013.01); *B65D 75/008* (2013.01); *B65D 75/5822* (2013.01); *B32B 2255/10* (2013.01); *B32B 2255/205* (2013.01); *B32B 2439/46* (2013.01)

(58) Field of Classification Search
CPC ......... B32B 15/09; B32B 15/20; B32B 27/08; B32B 27/32; B32B 27/34; B32B 27/36; B32B 2255/10; B32B 2255/20; B32B 2255/205; B32B 2307/30; B32B 2307/7242; B32B 2439/46; B65D 33/01; B65D 65/40; B65D 65/42; B65D 75/008; B65D 75/5822; B65D 2203/12
See application file for complete search history.

(56) References Cited

FOREIGN PATENT DOCUMENTS

| | | |
|---|---|---|
| JP | 2003-252337 A | 9/2003 |
| JP | 2003-276738 A | 10/2003 |
| JP | 2003-535723 A | 12/2003 |
| JP | 2008-222307 A | 9/2008 |
| JP | 2009-113830 A | 5/2009 |
| JP | 3184474 U | 6/2013 |
| JP | 2014-217735 A | 11/2014 |
| JP | 5667461 B2 | 2/2015 |
| JP | 2016-43543 A | 4/2016 |
| JP | 2016-43966 A | 4/2016 |
| JP | 2016-68982 A | 5/2016 |
| JP | 2017-65767 A | 4/2017 |
| KR | 20100058391 A * | 6/2010 .......... B65D 33/001 |
| KR | 20-2017-0003838 U | 11/2017 |
| WO | 01/97869 A1 | 12/2001 |

OTHER PUBLICATIONS

English machine translation of the description of JP 2016043966 A, obtained from Espacenet (Year: 2016).*
Office Action dated Jan. 19, 2021, issued in counterpart JP Application No. 2019-561631, with English machine translation. (11 pages).
International Search Report dated Feb. 19, 2019, issued in counterpart International Application No. PCT/JP2018/047178 (2 pages).
Extended (Supplementary) European Search Report dated Sep. 2, 2021, issued in counterpart EP Application No. 18895018.2. (7 pages).

* cited by examiner

[Fig. 1]
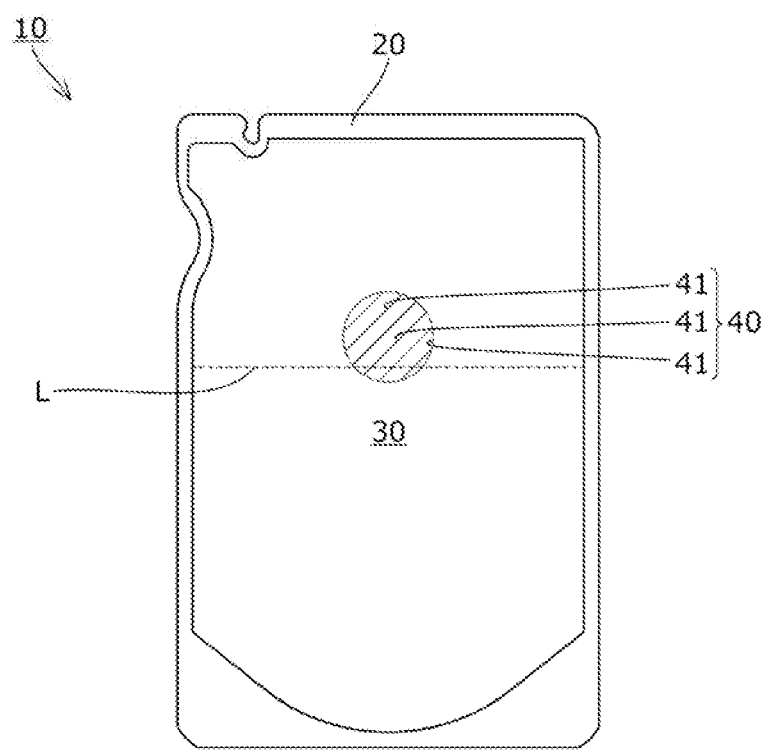
[Fig. 2]
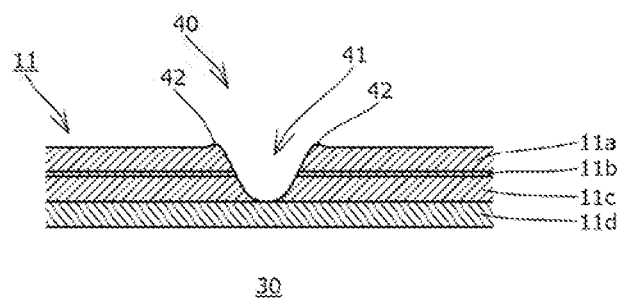

[Fig. 3]
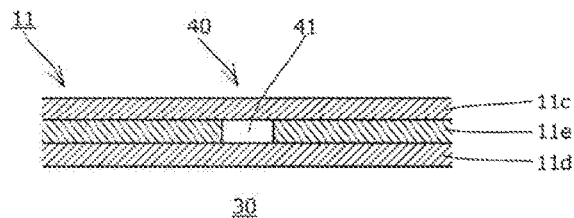
[Fig. 4]
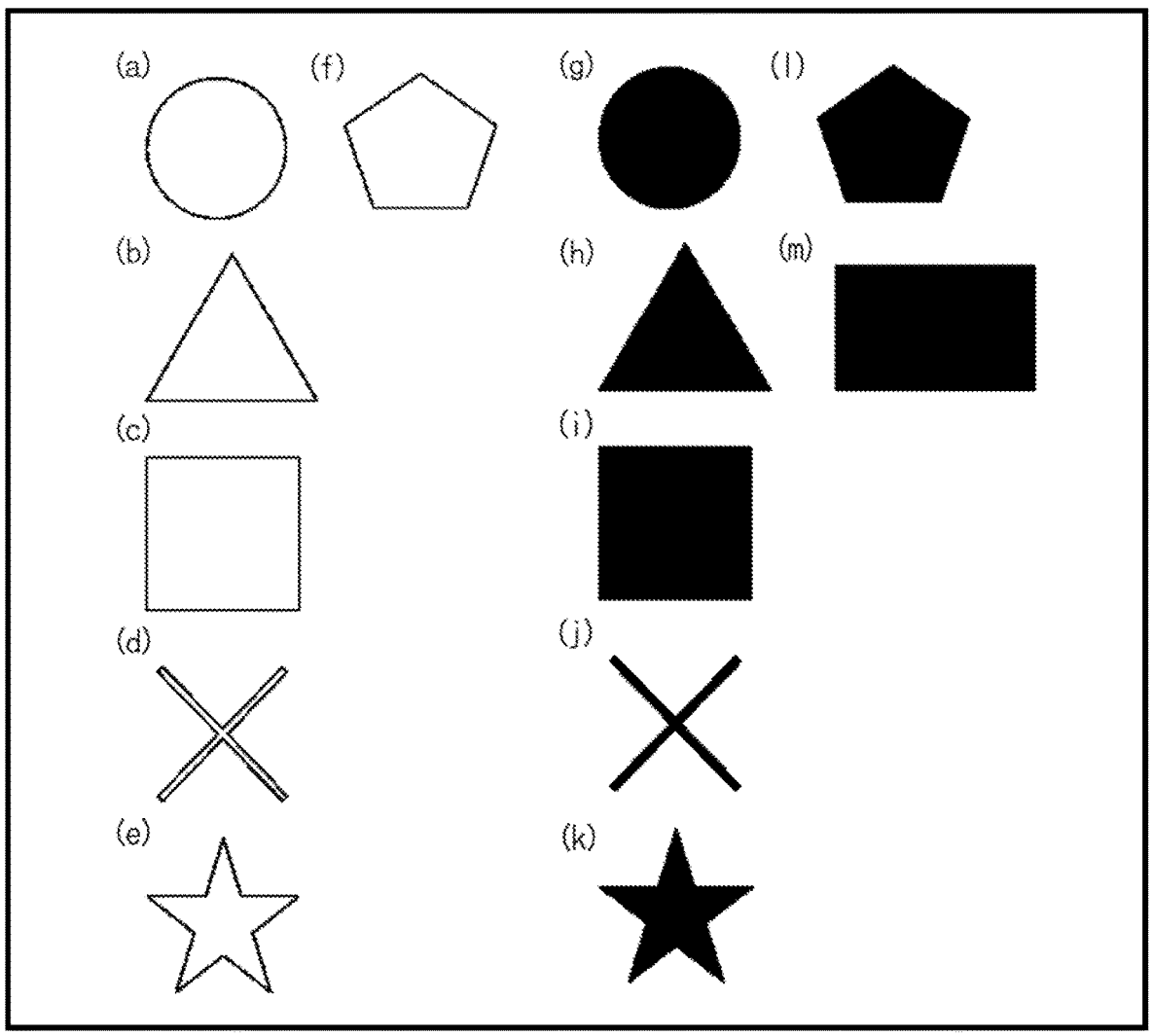

[Fig. 5]
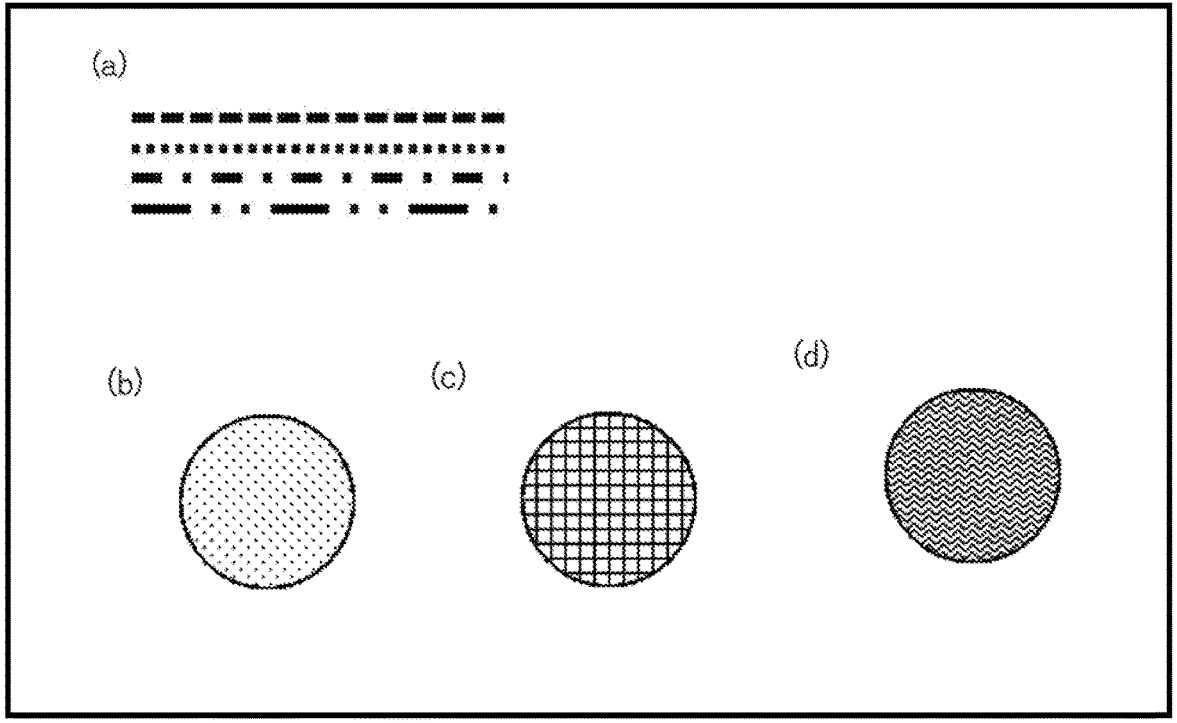
[Fig. 6]
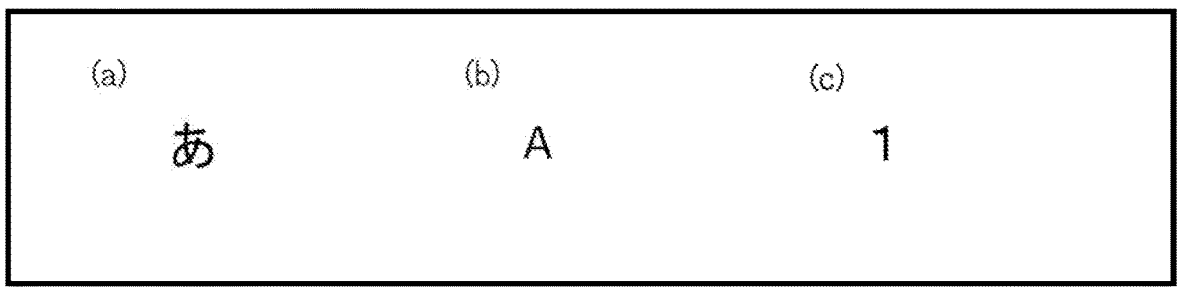

[Fig. 7]
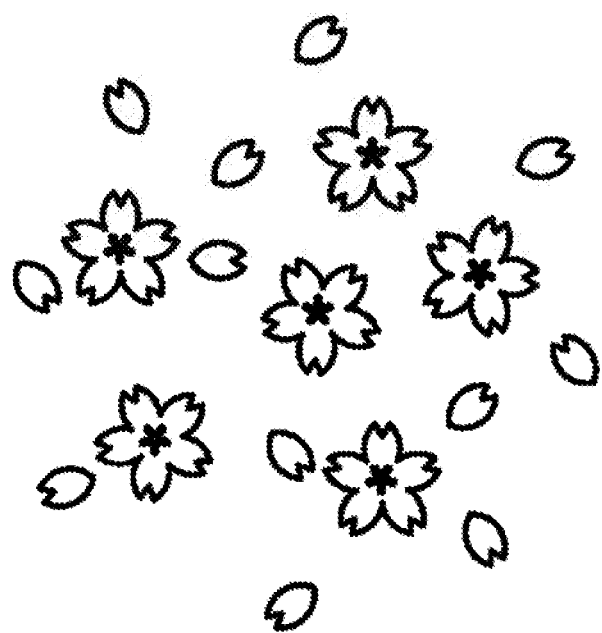

POUCH AND LIQUID CONTENT-CONTAINING POUCH

TECHNICAL FIELD

The present invention relates to a pouch that is formed in a bag shape by forming an outer peripheral sealing part by thermally bonding a film, and accommodates a content in an accommodating part inward from the outer peripheral sealing part, and a liquid content-containing pouch.

BACKGROUND ART

Conventionally, as a container for accommodating the content such as shampoo or detergent, a pouch that is formed in a bag shape by forming an outer peripheral sealing part by thermally bonding a film, and accommodates a content in an accommodating part inward from the outer peripheral sealing part has been widely used.

For such a pouch, in order to prevent the leakage to the outside or the deterioration of the quality of the content, in general, measures are figured out to impart the gas barrier property, the fragrance retaining property, and the like to the film forming the pouch. In the case of a product accommodating, in a pouch, shampoo, detergent, or the like, the fragrances of which are representative elements for defining the quality thereof, there is a demand for allowing the fragrance component contained in the content to be released to the outside in a displayed state of the product, and the like, and exciting the intention of a consumer to buy the product.

Then, as ingenuities for releasing the fragrance component contained in the content to the outside, known are the one configured such that the container accommodating the content is provided with a fragrance emitting hole penetrating through the inside and the outside of the container, thereby allowing the fragrance component contained in the content to be released to the outside as disclosed in Patent Literature 1, the one configured such that a window part formed in the container is opened, so that the perfume part closed in the container is exposed to the outside, thereby allowing the fragrance component contained in the content to be released to the outside as disclosed in Patent Literature 2, and the like.

CITATION LIST

Patent Literature

[Patent Literature 1] Japanese Patent Application Publication No. 2001-231846
[Patent Literature 2] Japanese Patent No. 5667461

SUMMARY OF INVENTION

Technical Problem

However, for the container disclosed in Patent Literature 1, the fragrance emitting hole for releasing the fragrance component contained in the content to the outside is formed penetrated through the inside and the outside of the container. For this reason, when the content are liquids such shampoo and detergent, the content leaks to the outside, and hence cannot be used. Further, external oxygen and the like penetrate into the container, which undesirably may result in deterioration of the quality of the content.

Further, similarly, also for the container disclosed in Patent Literature 2, in the case where the content is liquid such as shampoo and detergent, when the window part formed in the container is opened, the content leaks to the outside, and hence cannot be used. Further, external oxygen and the like penetrate into the container, which undesirably may result in deterioration of the quality of the content.

Under such circumstances, it is an object of the present invention to provide a pouch for solving the problem and capable of releasing the fragrance component contained in the content to the outside without opening the pouch while avoiding the leakage to the outside and the deterioration of the quality of the content with a simple configuration, and a liquid content-containing pouch.

Solution to Problem

The pouch of the present invention is a pouch that is formed in a bag shape by forming an outer peripheral sealing part by thermally bonding a film, and accommodates a content in an accommodating part inward from the outer peripheral sealing part, wherein a fragrance component releasing part is formed at a position corresponding to the accommodating part on at least one side of the film, and the fragrance component releasing part is configured of at least one of a material-removed part and a notched score formed in a partial range in a thickness direction of the film. As a result, the problem is solved.

A liquid content-containing pouch of the present invention is a liquid content-containing pouch which includes the pouch, and liquid content accommodated in the accommodating part. The pouch is formed as a standing pouch, and at least a part of the fragrance component releasing part is formed at a position below a liquid surface of the liquid content when the pouch in an unopened state standing upright. As a result, the problem is solved.

Advantageous Effects of Invention

In accordance with the invention according to claim 1, a fragrance component releasing part is formed at a position corresponding to the accommodating part on at least one side of the film, and the fragrance component releasing part is configured of at least one of a material-removed part and a notched score formed in a partial range in the thickness direction of the film. By thus forming the fragrance component releasing part so as not to penetrate through the film forming the pouch, it is possible to allow the fragrance component contained in the content to penetrate through the film at the fragrance component releasing part and to be released to the outside without opening the pouch.

In accordance with the invention according to claim 2, the fragrance component releasing part is configured of at least one of the material-removed part in a groove shape and the score formed from at least one of an inner surface and an outer surface of the film to a midpoint in the thickness direction of the film. As a result, it is possible to form the material-removed part in a groove shape or the score without requiring complicated processing or steps. For this reason, it is possible to avoid an increase in manufacturing cost.

In accordance with the invention according to claim 3, the total area in a pouch planar direction of the material-removed part constituting the fragrance component releasing part is set at 30 to 400 mm$^2$. As a result, it is possible to release the fragrance component with stability to such a degree as to be able to confirm the fragrance of the content from the outside of the pouch while avoiding the shortage of the residual amount of the fragrance component in the content due to excessive release of the fragrance component.

In accordance with the invention according to claim 4, the fragrance component releasing part is configured of the material-removed part in a groove shape formed from the inner surface of the film to a midpoint in the thickness direction of the film. As a result, it is possible to hold the content including the fragrance component in the material-removed part in a groove shape formed at the inner surface of the film. For this reason, it is possible to release the fragrance component from the fragrance component releasing part with stability even when the content is put in a state not being situated in the vicinity of the fragrance component releasing part according to the posture in which the pouch is put, or the like.

In accordance with the invention according to claim 5, a circumferential edge protruding part is formed at a circumferential edge of the material-removed part in a groove shape formed at the inner surface of the film. As a result, it is possible to increase the amount of the content held in the material-removed part in a groove shape. For this reason, it is possible to release the fragrance component from the fragrance component releasing part with stability. Further, by forming the material-removed part in a groove shape at the inner surface of the film by laser irradiation, it is possible to form the material-removed part in a groove shape and the circumferential edge protruding part all together by the heat during laser irradiation. For this reason, it is possible to avoid an increase in manufacturing cost.

In accordance with the invention according to claim 6, a circumferential edge protruding part is formed at a circumferential edge of the material-removed part in a groove shape formed at the outer surface of the film. As a result, the circumferential edge protruding part can suppress penetration of external dust, moisture, and the like into the material-removed part in a groove shape. For this reason, it is possible to avoid clogging of the material-removed part in a groove shape by external dust, moisture, and the like. This allows the fragrance component to be released with stability. Further, a consumer can perceive the presence and the position of the fragrance component releasing part by touching the outer surface of the film. Still further, the material-removed part in a groove shape is formed at the outer surface of the film by laser irradiation. As a result, it is possible to form the material-removed part in a groove shape and the circumferential edge protruding part all together by the heat during laser irradiation. For this reason, it is possible to avoid an increase in manufacturing cost.

In accordance with the invention according to claim 7, the plurality of layers constituting the film include a fragrance component barrier layer for suppressing penetration of the fragrance component therethrough. At least one of the material-removed part and the score is formed at at least a part of the fragrance component barrier layer. As a result, the material-removed part or the score is formed at the fragrance component barrier layer having a high fragrance retaining property for suppressing penetration of the fragrance component. For this reason, it is possible to release the fragrance component while ensuring the storability of the content.

In accordance with the invention according to claim 8, the fragrance component barrier layer includes a deposited layer of an inorganic oxide or a metal. As a result, the material-removed part or the score is formed at the fragrance component barrier layer having a high fragrance retaining property for suppressing penetration of the fragrance component with reliability. For this reason, it is possible to release the fragrance component while ensuring the storability of the content.

In accordance with the invention according to claim 9, the material-removed part or the score is formed so as to penetrate through the fragrance component barrier layer in a thickness direction. As a result, the material-removed part or the score is formed so as to penetrate through the fragrance component barrier layer having a high fragrance retaining property for suppressing penetration of the fragrance component in the thickness direction. For this reason, it is possible to surely release the fragrance component while ensuring the storability of the content.

In accordance with the invention according to claim 10, the plurality of layers forming the film include a first synthetic resin layer including a synthetic resin having a higher glass transition point than those of other synthetic resin layers, and at least one of the material-removed part and the score is formed at at least a part of the first synthetic resin layer. Thus, the material-removed part or the score is formed at the first synthetic resin layer having a high glass transition point and a high fragrance retaining property. As a result, it is possible to release the fragrance component with stability.

In accordance with the invention according to claim 11, the plurality of layers forming the film include a metal layer, and the material-removed part or the score is formed so as to penetrate through the metal layer in a thickness direction. Thus, the material-removed part or the score is formed at the metal layer having a high fragrance retaining property. As a result, it is possible to release the fragrance component with stability.

In accordance with the invention according to claim 12, the material-removed part or the score is formed so as to penetrate through the layer other than the innermost layer in the plurality of layers forming the film in a thickness direction. As a result, the layer separating the content containing the fragrance component from the outside is only the innermost layer. For this reason, it is possible to release the fragrance component with reliability.

In accordance with the invention according to claim 13, the fragrance component releasing part is configured of at least one assembly of the material-removed part and the score extending linearly in the pouch planar direction in a plan view of the pouch. As a result, it is possible to release the fragrance component in a dispersed manner over a wide range while suppressing the increase in total area of the fragrance component releasing part in the pouch planar direction.

In accordance with the invention according to claim 14, the fragrance component releasing part is configured of at least one of the material-removed part in a groove shape and the score formed from the outer surface of the film to a midpoint in the thickness direction of the film, and is formed in alignment with the print part formed on the film in the pouch planar direction. As a result, the material-removed part or the score forming the fragrance component releasing part can be used as a part of the design of the outer surface of the film.

In accordance with the invention according to claim 15, the fragrance component releasing part is configured of at least one of the material-removed part in a groove shape and the score formed from the outer surface of the film to a midpoint in the thickness direction of the film, and is formed in alignment with the embossed part formed on the film in the pouch planar direction. As a result, the design of the fragrance component releasing part can be enhanced, and the visibility of the position of the fragrance component releasing part is improved. Further, bonding between the innermost layers can be suppressed. For this reason, the inhibition of release of the fragrance component from the fragrance component releasing part is suppressed. This allows the fragrance component to be released to the outside with reliability.

In accordance with the invention according to claim 16, at least a part of the fragrance component releasing part is formed at a position below a liquid surface of the liquid content with the pouch in an unopened state standing upright. As a result, the fragrance component contained in the liquid content becomes more likely to be released through the fragrance component releasing part. For this reason, the fragrance component can be released with reliability.

In accordance with the invention according to claim 17, the fragrance component releasing part is formed at a position lying over the liquid surface of the liquid content with the pouch in an unopened state standing upright. As a result, it is possible to release the fragrance component with stability while avoiding the breakage of the film due to the liquid pressure. Namely, the fragrance component releasing part is formed at a position at which the material-removed part or the score is immersed in the liquid content while avoiding the position on the underside of the pouch at which a strong liquid pressure is applied to the film. As a result, it is possible to release the fragrance component with stability while avoiding the breakage of the film due to the liquid pressure.

BRIEF DESCRIPTION OF DRAWINGS

FIG. 1 is an explanatory view showing a pouch in accordance with one embodiment of the present invention.

FIG. 2 is an explanatory view showing a configuration of a film forming the pouch.

FIG. 3 is an explanatory view showing another configuration of the film forming the pouch.

FIG. 4 is an explanatory view showing another example of a shape of the fragrance component releasing part.

FIG. 5 is an explanatory view showing a still other example of the shape of the fragrance component releasing part.

FIG. 6 is an explanatory view showing an example of a pattern of the fragrance component releasing part.

FIG. 7 is an explanatory view showing another example of the pattern of the fragrance component releasing part.

DESCRIPTION OF EMBODIMENTS

Now, a pouch 10 in accordance with one embodiment of the present invention will be hereafter described by way of the drawings.

The pouch 10 is formed in a bag shape by forming an outer peripheral sealing part 20 including front and back films 11 thermally bonded to each other as shown in FIG. 1, and accommodates the liquid content in an accommodating part 30 inward from the outer peripheral sealing part 20.

At one of the front and back films 11, as shown in FIG. 1, a fragrance component releasing part 40 for releasing the fragrance component contained in the liquid content to the outside of the pouch 10 at the position corresponding to the accommodating part 30 (i.e., the position at which the front and back films 11 are not thermally bonded inward from the outer peripheral sealing part 20).

The fragrance component releasing part 40 is configured of at least one of a material-removed part 41 and a notched score formed in a partial range in the thickness direction of the films 11 (i.e., the range not penetrating through the film 11 in the thickness direction) as illustrated in FIG. 1, and in the present embodiment, is configured of the groove-shaped material-removed part 41 formed from the outer surface (i.e., the surface facing the outside of the pouch 10) of the films 11 to the midpoint in the thickness direction of the film 11.

By thus forming the material-removed part 41 (or score) at the film 11, it is possible to cause the fragrance component of the liquid content to penetrate through the thinned part (in the present embodiment, a polyethylene layer 11d) of the film 11, and to be released to the outside of the pouch 10 while preventing the leakage of the liquid content to the outside.

Further, at the circumferential edge of the groove-shaped material-removed part 41 formed at the outer surface of the film 11, as shown in FIG. 2, a circumferential edge protruding part 42 rising outwardly from the outer surface of the film 11 is formed. The circumferential edge protruding part 42 is formed at the circumferential edge of the material-removed part 41 by the heat during laser irradiation when the material-removed part 41 has been formed at the outer surface of the film 11 by laser irradiation.

Further, the film 11 is configured of a plurality of layers stacked in the thickness direction as shown in, FIG. 2. The plurality of layers forming the film 11 includes a fragrance component barrier layer for suppressing the penetration of the fragrance component therethrough. In the present embodiment, a PET (polyethylene terephthalate) layer 11a, an aluminum deposited layer 11b, a nylon layer 11c, and a polyethylene layer 11d are formed sequentially from the outer surface side.

The fragrance component barrier layer can include an aluminum foil or metal deposited layer, or an inorganic deposited film obtained by providing a polyester film or a polyamide film with an inorganic deposited layer. Examples of the inorganic deposited layer may include a deposited layer of a metal oxide such as aluminum oxide, and a deposited layer of an inorganic oxide such as silicon oxide. Alternatively, the fragrance component barrier layer may include a coating film layer including a barrier resin coating agent including a polycarboxylic acid type polymer, vinylidene chloride, or an ethylene vinyl alcohol copolymer.

The material-removed part 41 is formed at at least a part of a first synthetic resin layer including a synthetic resin having a higher glass transition point than those of other synthetic resin layers forming the film 11 as shown in FIG. 2, and may be formed so as to penetrate therethrough in the thickness direction. In the present embodiment, the material-removed part 41 is formed in the PET layer 11a throughout in the thickness direction, and more specifically, is formed so as to penetrate through the nylon layer 11c and the aluminum deposited layer 11b in the thickness direction of the film 11. As with the example of FIG. 2, the material-removed part 41 can be formed so as to penetrate through layers (the PET layer 11a, the aluminum deposited layer 11b, and the nylon layer 11c) other than the innermost layer (the polyethylene layer 11d) of the plurality of layers forming the film 11 in the thickness direction.

Further, the material-removed part 41 is formed so as to penetrate through the metal layer included in the plurality of layers forming the film 11 in the thickness direction, and in the present embodiment, is formed so as to penetrate through the aluminum deposited layer 11b of the fragrance component barrier layer (metal layer) in the thickness direction as shown in FIG. 2.

FIG. 3 shows another configuration of the film 11, in which the film 11 is formed of a nylon layer 11c, an aluminum foil layer 11e, and a polyethylene layer 11d sequentially from the outer surface side. In the case of this configuration, the material-removed part 41 is formed at the aluminum foil layer 11e of the fragrance component barrier layer (metal layer) so as to penetrate through the aluminum foil layer 11e.

Further, the fragrance component releasing part 40 is formed of the assembly of a plurality of material-removed parts 41 extending linearly in the pouch planar direction in a plan view of the pouch 10 as shown in, FIG. 1.

Further, the fragrance component releasing part 40 may be formed of the assembly of the plurality of material-removed parts 41 formed in a circle.

Further, the total area of the material-removed parts 41 in the pouch planar direction (i.e., the total area of the material-removed parts 41 in a plan view of the pouch 10) is set at 30 to 400 mm.

Further, the ratio of the area of the fragrance component releasing part 40 in the pouch planar direction in the fragrance component releasing area including the fragrance component releasing part 40 (material-removed part 41) (the density of the material-removed parts 41) is set at 2 to 60 area %, and preferably 10 to 40 area %. The higher the density of the material-removed parts 41 is, the higher the degree of release of the fragrance component is. The density of the material-removed parts 41 being 2 to 60 area % suppresses the excessive release of the fragrance component and the inflow of the external atmosphere into the accommodating part 30. Thus, it is possible to allow a user to surely recognize the fragrance component while preventing the quality deterioration of the content, and the like.

The fragrance component releasing area represents the region including the fragrance component releasing part 40 and the vicinity thereof.

Further, the ratio of the area of the material-removed parts 41 in the pouch planar direction in the fragrance component releasing area is calculated in the following manner. Namely, a given virtual region in a square of 30 mm in length and 30 mm in width is assumed so as to include the material-removed parts 41 in the fragrance component releasing area; the ratio of the area of the material-removed parts 41 in the virtual region is calculated; and the maximum value thereof is assumed to be the density of the material-removed parts 41 in the fragrance component releasing area.

At the film 11, a print part on which characters, patterns, or the like are printed (not shown) is formed. The fragrance component releasing part 40 is formed in alignment with the print part in the pouch planar direction.

Further, at the film 11, an embossed part subjected to embossing (not shown) is formed. The fragrance component releasing part 40 is formed in alignment with the embossed part in the pouch planar direction.

Further, in the present embodiment, the pouch 10 is formed as a standing pouch capable of self-standing as shown in FIG. 1. The fragrance component releasing part 40 is formed at a position lying over the liquid surface L of the liquid content at at least one of the front and back films with the pouch 10 accommodating the liquid content in the accommodating part 30 in an unopened state standing upright.

Further, when the pouch 10 is formed as a standing pouch, the fragrance component releasing part 40 may be formed at the bottom material film.

Experimental Example of the present invention will be described hereafter.

Experimental Example: Difference in Size of Area of Material-Removed Part

Respective two films each including a polyethylene layer (inner layer), a nylon layer, an aluminum oxide deposited layer, and a PET layer stacked in this order therein were prepared. In respective one films thereof, respective material-removed parts were formed by removing the nylon layer, the aluminum oxide deposited layer, and the PET layer so as to penetrating the layers throughout in the thickness direction without removing the polyethylene layer (inner layer) with laser processing so that the shape of each material-removed part was a rectangle as shown in FIG. 4(m), and the total areas were 20 $mm^2$, 30 $mm^2$, 50 $mm^2$, 100 $mm^2$, 400 $mm^2$, 600 $mm^2$, and 1000 $mm^2$, respectively, thereby manufacturing films including the material-removed parts. Each of the material-removed part-including film and the film not provided with the material-removed part were stacked so that the polyethylene layers (inner layers) were opposed to each other. The three sides were heat sealed so that the whole region of the material-removed part was included in the accommodating part, and a softener containing a fragrance component was filled therein. Then, respective residual one sides were heat sealed, and liquid sealed, thereby manufacturing pouches. These are referred to as pouches [1] to [7].

For the pouches [1] to [7], the following fragrance discrimination test and release degree test of the fragrance to the peripheral atmosphere were performed. The results are shown in Table 1.

[Fragrance Discrimination Test]

Whether a tester can confirm the fragrance or not with a distance between the material removed region of the pouch and the nose of 50 mm was tested.

—Evaluation Criteria—

○: feel fragrance

X: not feel fragrance

[Release Degree Test of Fragrance to Peripheral Atmosphere]

A pouch was stored in a 72-L thermostat with a lid put thereon under normal temperature environment for 24 hours. Then, whether a tester can feel the fragrance in the thermostat when the lid is taken off, or not was tested.

—Evaluation Criteria—

○: not feel fragrance

X: feel fragrance

TABLE 1

| | Total area of material-removed parts [$mm^2$] | | | | | | |
|---|---|---|---|---|---|---|---|
| Pouch No. | 20 [1] | 30 [2] | 50 [3] | 100 [4] | 400 [5] | 600 [6] | 1000 [7] |
| Discrimination of fragrance | X | ○ | ○ | ○ | ○ | ○ | ○ |
| Release degree of fragrance | ○ | ○ | ○ | ○ | ○ | X | X |

As apparent from Table 1, it has been confirmed as follows: the total area of the material-removed part is 30 $mm^2$ or more and 400 $mm^2$ or less; this suppresses excessive release of the fragrance component even when the fragrance component is stored under an enclosed environment, while allowing the discrimination of the fragrance.

Up to this point, the embodiment of the present invention was described in detail. However, the present invention is not limited to the embodiment, and may be various changed in design without departing from the present invention described in the appended claims. Further, the configuration of the embodiment and the configurations of respective modified examples described below may be combined arbitrarily.

For example, in the embodiment, a description has been given assuming that the structure of the film 11 includes the PET layer 11a, the aluminum deposited layer 11b, the nylon layer 11c, and the polyethylene layer 11d sequentially formed from the outer surface side. However, any specific structure of the structure of the film 11 such as the structure in which the nylon layer 11c and the polyethylene layer 11d are sequentially formed from the outer surface side is acceptable.

As other configurations of the film 11 than that described above, mention may be made of, sequentially from the outer surface side, PET layer/aluminum foil layer/nylon layer/straight-chain type low density polyethylene layer, PET layer/nylon layer/aluminum foil layer/straight-chain type low density polyethylene layer, nylon layer/aluminum foil layer/straight-chain type low density polyethylene layer, PET layer/aluminum deposited PET layer/straight-chain type low density polyethylene layer, nylon layer/aluminum deposited PET layer/straight-chain type low density polyethylene layer, aluminum oxide deposited PET layer/straight-chain type low density polyethylene layer, silicon oxide deposited PET layer/straight-chain type low density polyethylene layer, aluminum oxide deposited PET layer/nylon layer/straight-chain type low density polyethylene layer, silicon oxide deposited PET layer/nylon layer/straight-chain type low density polyethylene layer, and the like. As the innermost layer on the most inner side of the layer to be heat sealed, other than those described above, a polypropylene layer can be used.

Further, in the embodiment, a description has been given assuming that the content to be accommodated in the accommodating part 30 of the pouch 10 is a liquid such as shampoo, hair conditioner, conditioner, detergent, or softener. However, the specific form of the content of the pouch 10 is not limited to the foregoing, and may be, for example, a fluid of a mixture of a solid and a liquid, or a solid. Further, the content to be accommodated in the accommodating part 30 of the pouch 10 is not limited to the non-food as described above, and may be food such as coffee beans, tealeaves, or curry. Further, the content to be accommodated in the accommodating part 30 of the pouch 10 may be a beverage such as liquid coffee.

Further, in the embodiment, a description has been given assuming that the pouch 10 is of a standing pouch type. However, as the specific forms of the pouch 10, various forms such as a pillow type pouch, a gusset type pouch, a flat pouch including a sachet, a square bottom pouch, and a zippered pouch can be adopted.

Furthermore, in the embodiment, a description has been given assuming that the fragrance component releasing part 40 is formed at only one of the front and back films 11. However, the fragrance component releasing part 40 may be formed at both of the front and back films 11.

Still further, in the embodiment, a description has been given assuming that the fragrance component releasing part 40 is configured of the material-removed part 41 formed by removing a part of the film 11. However, the fragrance component releasing part 40 may be configured of a notched slit formed without removing a part of the film 11. Alternatively, the fragrance component releasing part 40 may be configured of the material-removed part 41 and a slit.

Further, in the embodiment, a description has been given assuming that the material-removed part 41 (or the slit) constituting the fragrance component releasing part 40 is formed at the outer surface of the film 11. However, the formation position of the material-removed part 41 (or the score) constituting the fragrance component releasing part 40 is not limited to the foregoing. The material-removed part 41 (or the score) constituting the fragrance component releasing part 40 may only be formed at at least one of the outer surface of the film 11, the inner surface of the film 11 (i.e., the surface facing the accommodating part 30 side), and the inside of the film 11 (i.e., the portion inward from the inner surface and the outer surface in the thickness direction).

Still further, in the embodiment, a description has been given assuming that the fragrance component releasing part 40 is formed at a position lying over the liquid surface L of the liquid content with the pouch 10 in an unopened state standing upright. However, the whole fragrance component releasing part 40 may be formed at a position above the liquid surface L of the liquid content. Alternatively, the whole fragrance component releasing part 40 may be formed at a position below the liquid surface L of the liquid content. Particularly, from the viewpoint of enhancing the visibility from a user, the fragrance component releasing part 40 may be formed at the uppermost position with the pouch 10 standing upright. Whereas, when the pouch 10 is a pouch in a form having the top surface, the fragrance component releasing part 40 may be formed at the top surface of the pouch.

Furthermore, in the embodiment, a description has been given assuming that the whole fragrance component releasing part 40 is formed at the position corresponding to the accommodating part 30. However, a part of the fragrance component releasing part 40 may be formed at the position corresponding to the outer peripheral sealing part 20.

Still further, in the embodiment, a description has been given assuming that laser irradiation is used as the processing method of the material-removed part 41. However, the processing method of the material-removed part 41 and the score are not limited to the foregoing. For example, by half cut processing, cutting processing, or grinding processing using a jig such as an edged tool, the material-removed part 41 or the score may be formed. Further, the processing method of the material-removed part 41 or the score in the pouch 10 is not limited to the method for performing laser processing on the film 11 when the film 11 is configured of a plurality of layers. Only the fragrance component barrier layer or the material layer including the fragrance component barrier layer, before bonding of respective layers so as to become the film 11 is subjected to laser processing by laser irradiation or cutting processing by an edged tool. Then, a prescribed material layer (e.g., an innermost layer) is bonded thereto, thereby forming the film 11. As a result, the material-removed part 41 or the score may be formed.

When the material-removed part 41 is formed at the inner surface of the film 11 by laser irradiation, as with the circumferential edge protruding part 42 shown in FIG. 2, a circumferential edge protruding part is formed at the circumferential edge of the material-removed part 41.

Further, in the embodiment, a description has been given assuming that the fragrance component releasing part 40 is configured of an assembly of the plurality of material-removed parts 41 extending linearly in the pouch planar direction. However, the specific form of the fragrance component releasing part 40 is not limited to the foregoing. The fragrance component releasing part 40 may be configured of, for example, the one extending linearly in the pouch planar direction, the one formed in a sheet shape, the one in a dot shape, the one in a chain line shape, or in a broken line shape, or an assembly of a combination of these. From the viewpoint of the high drop bag breakage resistance, the fragrance component releasing part 40 more preferably be configured of the one in a discontinuous shape such as dots or a broken line than including the one in a continuous linear shape. FIGS. 4(a) to (f) each show an example in which the fragrance component releasing part 40 is configured of one linearly extending material-removed part 41. Further, FIGS. 4(g) to (m) each show an example in which the fragrance component releasing part 40 is configured of the material-removed part 41 formed in a planar shape. Furthermore, FIG. 5(a) shows an example in which the fragrance component releasing part 40 is configured of an assembly of the material-removed parts 41 in a broken line shape. Still further, FIG. 5(b) shows an example in which the fragrance component releasing part 40 is configured of dot-shaped material-removed parts 41 and one linearly extending material-removed part 41. Further, FIGS. 5(c) and (d) each show another example in which the fragrance component releasing part 40 is configured of an assembly of a plurality of linear material-removed parts 41. Still further, for the fragrance component releasing part 40, the material-removed part 41 may be formed in a shape to be a significant letter, numeral, or sign as shown in FIGS. 6 (a) to (c), or the material-removed part 41 may be formed in a shape to be a pattern having designability as shown in FIG. 7. In FIGS. 4 to 7, the black painted region is the material-removed part 41.

Further, how the fragrance comes out can be adjusted by changing the shape of processing, the processing position, and the area of the material-removed part 41 or the score forming the fragrance component releasing part 40 according to the intensity of the fragrance of the content.

REFERENCE SIGNS LIST

10 Pouch
11 Film
11a PET layer (first synthetic resin layer)
11b Aluminum deposited layer (metal layer)
11c Nylon layer
11d Polyethylene layer
11e Aluminum foil layer (metal layer)
20 Outer peripheral sealing part
30 Accommodating part
40 Fragrance component releasing part
41 Material-removed part
42 Circumferential edge protruding part

The invention claimed is:

1. A pouch that is formed in a bag shape by forming an outer peripheral sealing part by thermally bonding a film, and accommodates a content in an accommodating part inward from the outer peripheral sealing part, wherein
a fragrance component releasing part is formed at a position corresponding to the accommodating part on at least one side of the film, and
the fragrance component releasing part is configured of at least one of a material-removed part or a notched score formed in a partial range in a thickness direction of the film,
wherein a ratio of an area of the fragrance component releasing part in a pouch planar direction in a fragrance component releasing area including the fragrance component releasing part is set at 2 to 60 area %,
the fragrance component releasing area represents the region including the fragrance component releasing part and the vicinity thereof,
a given virtual region in a square of 30 mm in length and 30 mm in width is formed so as to include the material-removed part in the fragrance component releasing area, a ratio of an area of the material-removed part in the virtual region is calculated, and a maximum value thereof is a density of the material-removed part in the fragrance component releasing area,
wherein liquid content is accommodated in the accommodating part,
the pouch is formed as a standing pouch,
at least a part of the fragrance component releasing part is formed at a position below a liquid surface of the liquid content when the pouch is in an unopened state standing upright, and
the fragrance component releasing part is formed at a position lying over the liquid surface of the liquid content with the pouch in an unopened state standing upright,
wherein the fragrance component releasing part is formed so as to penetrate in the thickness direction of the film from an inner surface of the film through a plurality of layers constituting the film other than an outermost layer,
wherein the accommodating part is completely surrounded without interruption by the outermost layer of the film,
wherein the fragrance component releasing part is at least configured of the material-removed part in a groove shape formed form an inner surface of the film to a midpoint in a thickness direction of the film,
wherein a circumferential edge protruding part is formed at a circumferential edge of the material-removed part in a groove shape formed at the inner surface of the film, and
wherein the circumferential edge protruding part rising inwardly from the inner surface of the film is integrally continuous with the innermost layer.

2. The pouch according to claim 1, wherein the fragrance component releasing part is at least configured of the material-removed part, and
a total area in the pouch planar direction of the material-removed part is set at 30 to 400 mm².

3. The pouch according to claim 1, wherein the film is configured of the plurality of layers stacked in the thickness direction,
the plurality of layers include a fragrance component barrier layer for suppressing penetration of the fragrance component therethrough, and
at least one of the material-removed part or the score is formed at at least a part of the fragrance component barrier layer.

4. The pouch according to claim 3, wherein the fragrance component barrier layer includes a deposited layer of an inorganic oxide or a metal.

5. The pouch according to claim 3, wherein at least one of the material-removed part or the score is formed so as to penetrate through the fragrance component barrier layer in a thickness direction thereof.

6. The pouch according to claim 1, wherein the film is configured of the plurality of layers stacked in the thickness direction,
the plurality of layers include a first synthetic resin layer composed of a synthetic resin having a higher glass transition point than that of a second synthetic resin layer, and
at least one of the material-removed part and the score is formed at at least a part of the first synthetic resin layer.

7. The pouch according to claim 1, wherein the film is configured of the plurality of layers stacked in the thickness direction, the plurality of layers include a metal layer, and
at least one of the material-removed part and the score is formed so as to penetrate through the metal layer in a thickness direction thereof.

8. The pouch according to claim 1, wherein the film is configured of the plurality of layers stacked in the thickness direction, and at least one of the material-removed part and the score is formed so as to penetrate through the layer other than the outermost layer in the plurality of layers in a thickness direction thereof.

9. The pouch according to claim 1, wherein the fragrance component releasing part is configured of at least one assembly of the material-removed part or the score and extends linearly in the pouch planar direction in a plan view of the pouch.

10. The pouch according to claim 1, wherein a print part is formed on the film, and the fragrance component releasing part is configured of at least one of the material-removed part in a groove shape or the score formed to a midpoint in the thickness direction of the film, and is formed in alignment with the print part in the pouch planar direction.

11. The pouch according to claim 1, wherein an embossed part subjected to embossing is formed in the film, and the fragrance component releasing part is configured of at least one of the material-removed part in a groove shape or the score formed to a midpoint in the thickness direction of the film, and is formed in alignment with the embossed part in the pouch planar direction.

12. A pouch that is formed in a bag shape by forming an outer peripheral sealing part by thermally bonding a film, and accommodates a content in an accommodating part inward from the outer peripheral sealing part, wherein a fragrance component releasing part is formed at a position corresponding to the accommodating part on at least one side of the film, and
the fragrance component releasing part is configured of at least one of a material-removed part or a notched score formed in a partial range in a thickness direction of the film,
wherein a ratio of an area of the fragrance component releasing part in a pouch planar direction in a fragrance component releasing area including the fragrance component releasing part is set at 2 to 60 area %,
the fragrance component releasing area represents the region including the fragrance component releasing part and the vicinity thereof,
a given virtual region in a square of 30 mm in length and 30 mm in width is formed so as to include the material-removed part in the fragrance component releasing area, a ratio of an area of the material-removed part in the virtual region is calculated, and a maximum value thereof is a density of the material-removed part in the fragrance component releasing area,
wherein liquid content is accommodated in the accommodating part,
the pouch is formed as a standing pouch,
at least a part of the fragrance component releasing part is formed at a position below a liquid surface of the liquid content when the pouch is in an unopened state standing upright, and
the fragrance component releasing part is formed at a position lying over the liquid surface of the liquid content with the pouch in an unopened state standing upright,
wherein the fragrance component releasing part is formed so as to penetrate in the thickness direction of the film from an outer surface of the film through a plurality of layers constituting the film other than an innermost layer,
wherein the accommodating part is completely surrounded without interruption by the innermost layer of the film, and
wherein the fragrance component releasing part is at least configured of the material-removed part in a groove shape formed from the outer surface of the film to a midpoint in the thickness direction of the film,
wherein a circumferential edge protruding part is formed at a circumferential edge of the material-removed part in a groove shape formed at the outer surface of the film, and
wherein the circumferential edge protruding part rising outwardly from the outer surface of the film is integrally continuous with an outermost layer.

* * * * *